US007174050B2

(12) United States Patent
Balmelli et al.

(10) Patent No.: US 7,174,050 B2
(45) Date of Patent: Feb. 6, 2007

(54) SPACE-OPTIMIZED TEXTURE MAPS

(75) Inventors: Laurent Balmelli, White Plains, NY (US); Fausto Bernardini, New York, NY (US); Gabriel Taubin, Hartsdale, NY (US)

(73) Assignee: International Business Machines Corporation, Armonk, NY (US)

(*) Notice: Subject to any disclaimer, the term of this patent is extended or adjusted under 35 U.S.C. 154(b) by 856 days.

(21) Appl. No.: 10/310,428

(22) Filed: Dec. 5, 2002

(65) Prior Publication Data

US 2003/0152288 A1 Aug. 14, 2003

(51) Int. Cl.
*G06K 9/36* (2006.01)
*G06T 15/30* (2006.01)
*G09G 5/00* (2006.01)

(52) U.S. Cl. ...................... 382/276; 345/423; 345/582; 382/241

(58) Field of Classification Search ................ 382/154, 382/241, 276, 285, 293; 345/419, 420, 423, 345/582
See application file for complete search history.

(56) References Cited

U.S. PATENT DOCUMENTS 6,137,923 A 10/2000 Takeo et al. ................ 382/308
6,233,362 B1 5/2001 Takeo et al.
6,477,279 B2 11/2002 Go ............................ 382/240

FOREIGN PATENT DOCUMENTS

EP 1 134 697 A2 9/2001
EP 1 146 479 A2 10/2001
JP 08-272930 10/1996

OTHER PUBLICATIONS

Hunter et al., "Uniform Frequency Images: Adding Geometry to Images to Produce Space-Efficient Textures," IEEE Visualization, 2000, pp. 243-251.*
Sloan et al. "Importance Driven Texture Coordinate Optimization," Eurographics '98, 1998, 17(3), pp. 97-104.*

* cited by examiner

*Primary Examiner*—Vikkram Bali
*Assistant Examiner*—Colin LaRose
(74) *Attorney, Agent, or Firm*—Ido Tuchman; Lisa M. Yamonaco

(57) ABSTRACT

A method, system, and computer program product for adjusting a unit image area within an input image according to information importance within the unit area. An image receiver configured to receive the input image. An image warper is coupled to an importance map as is configured to generate a warped image such that regions of higher importance in the input image are expanded in the warped image and regions of lower importance in the input image are compressed in the warped image. The importance map is configured to delineate the regions of higher importance and the regions of lower importance in the input image. Texture coordinates may also be warped in a similar manner. Thus, the image is unwarped automatically by modern graphics adapters having texture mapping capabilities.

16 Claims, 8 Drawing Sheets

SPACE-OPTIMIZED TEXTURE MAPS

RELATED APPLICATIONS

This application is related to and claims the benefit of the filing date of U.S. provisional application No. 60/356,441 filed Feb. 12, 2002, and is incorporated herein by reference.

FIELD OF THE INVENTION

The present invention relates generally to image processing, and in particular to equalization of the information content in an image such that the image is more resistant to downsizing distortions.

BACKGROUND

Texture images are a simple yet effective way to increase realism of polygonal meshes at low cost. Most current hardware graphics accelerators provide a memory cache to store texture images. Images in the cache can be accessed by the Graphics Processing Unit (GPU) through a high-bandwidth connection, improving frame rate. However, the size of the cache is limited by its cost, especially in commercial game-oriented graphics boards and game consoles. Because not all textures used by an application can reside in memory at the same time, complex memory management algorithms need to be used. In high-end applications, such as flight simulators, where larger caches are available, the amount of textures employed increases proportionally, requiring the same careful allocation of texture memory.

Image compression can alleviate the problem of limited texture memory. However, to obtain interactive frame rates, the compressed texture must be decoded on the fly during rendering, which requires specialized hardware. To optimally use texture memory available on today's traditional graphics boards, several authors have looked at the problem of reducing the space required to store the texture image, without resorting to complicated encoding.

Except for simple textures containing repetitive patterns, details are typically not uniformly distributed across the image. For example, models obtained with 3D scanning systems are often textured with images that contain a large amount of background pixels. Faces of humans and characters need high-resolution details in areas such as the eyes and mouth, while the appearance of other regions can be captured with relatively fewer pixels per unit area.

SUMMARY OF THE INVENTION

The present invention addresses the above-mentioned limitations by implementing a technique that optimizes the space used by texture images. In one implementation of the invention, image frequency content is distributed uniformly across the image. In other words, the image is stretched in high frequency areas and contracted in low frequency regions. The texture coordinates are remapped in a similar manner to take into account image distortions. The resulting image can then be resampled at a lower rate (shrunk) with minimal detail loss in areas enclosing high frequency content. Alternatively, the image can be subsampled more aggressively with a uniform loss of visual fidelity across its regions. Only the texture image and texture coordinates are affected by the optimization process. Neither the model geometry nor its connectivity change. The smaller optimized image uses less texture memory, but does not require special hardware: its "decompression" is automatically performed through the texture mapping function available in common graphic hardware.

Thus, an aspect of the present invention involves a method for adjusting a unit image area within an input image according to information importance within the unit area. The method includes an obtaining operation to obtain an importance map. The importance map delineates regions of higher importance and regions of lower importance in the input image. A warping operation then warps the input image to produce a warped image according to the importance map such that the regions of higher importance are expanded and the regions of lower importance are contracted.

Another aspect of the invention is a system for preserving important information in an input image. The input image includes an associated input texture coordinate mapping, and the system includes an image receiver and an image warper. The image receiver is configured to receive the input image. The image warper is coupled to an importance map and is configured to generate a warped image such that regions of higher importance in the input image are expanded in the warped image and regions of lower importance in the input image are compressed in the warped image. The importance map is configured to delineate the regions of higher importance and the regions of lower importance in the input image.

Yet another aspect of the invention is a computer program product with computer readable program codes for adjusting a unit image area within an input image according to information importance within the unit area. The computer readable program codes are configured to obtain an importance map and warp the input image according to the importance map such that the regions of higher importance are expanded and the regions of lower importance are contracted.

The foregoing and other features, utilities and advantages of the invention will be apparent from the following more particular description of various embodiments of the invention as illustrated in the accompanying drawings.

DETAILED DESCRIPTION OF THE INVENTION

Figure 1A:
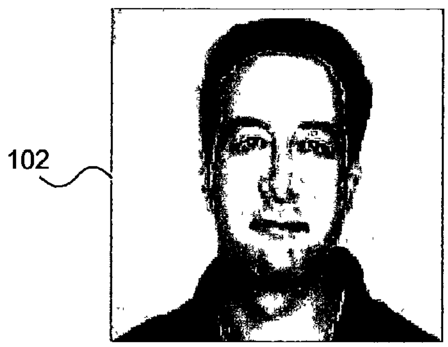
FIG. 1A shows an exemplary input image utilized by the present invention.

As detailed below, the present invention beneficially optimizes the space used by images. Important image information is stretched to cover more of the image area, while less important information is contracted. Thus, a resulting warped image is created such that a ratio of information importance per unit area is substantially constant throughout the image. The invention is described herein with reference to FIGS. 1–9. When referring to the figures, like structures and elements shown throughout are indicated with like reference numerals.

In FIG. 1A, an exemplary image 102 suitable for processing according to one embodiment of the present invention is shown. The image 102 may be any image type and may be encoded using various techniques known by those skilled in the art. For example, the image 102 may be compressed, uncompressed, black and white, gray scale, or color. Furthermore, the image 102 may be stored in computer memory or may be transmitted across a computer network. Thus, the image 102 generally consumes some system resources, such as memory space or network bandwidth.

Figure 1B:
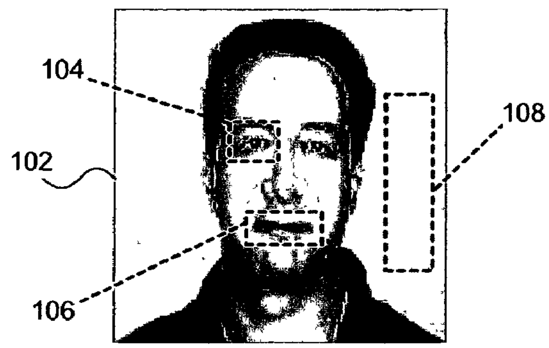
FIG. 1B shows an input image with regions of greater importance and lesser importance delineated.

In FIG. 1B, the image 102 is shown with regions of greater importance and lesser importance delineated. Image regions containing distinguishing facial features, for example, may be designated as more important than regions without such features. Thus, an eye region 104 and a mouth region 106 may, for one application, be designated as regions of greater importance in the image 102. Conversely, a background region 108 may be designated as a region of lower importance in the image 102. As described in detail below, an importance map is utilized by the present invention to distinguish areas of greater importance and lesser importance in the image 102.

The invention strives to reduce the amount of system resources consumed by the image 102 while minimizing the amount of image detail loss in regions designated as important. To achieve this goal, the invention warps the image 102 such that important image regions are expanded and less important image regions are contracted according to the importance map. The entire warped image is then reduced in size so that it consumes less system resources. At a later point, when the image is to be utilized, the reduced warped image is expanded and unwarped.

Figure 1C:
FIG. 1C shows an exemplary warped image, as contemplated by one embodiment of the invention.

In FIG. 1C, a warped image 110 contemplated by the present invention is shown. Regions designated as more important in the importance map are expanded, while regions designated as less important are contracted in the warped image 110. Thus, the eye region 112 and mouth region 114 in the warped image 110 are larger than the corresponding eye region 104 and mouth region 106 in the original image 102. Additionally, the background region 116 in the warped image 110 is smaller than the background region 108 in the original image 102. It should be noted that the canvas size of the warped image 110 is the same as the canvas size of the original image 102.

Figure 1D:
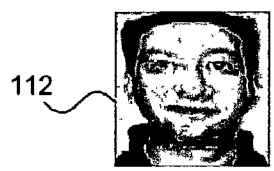
FIG. 1D shows an exemplary shrunken warped image, as contemplated by one embodiment of the invention.

In FIG. 1D, a smaller warped image 112 is shown. The smaller warped image 112 uses less system resources than the original image 102. It is contemplated that any image processing method known by those skilled in the art to reduce the system resources consumed by the warped image 110 may be employed by the invention. In general, the processing method used by the invention is a lossy compression scheme, such as image downsizing, discrete cosine transformations, or a combination of compression techniques.

Figure 1E:
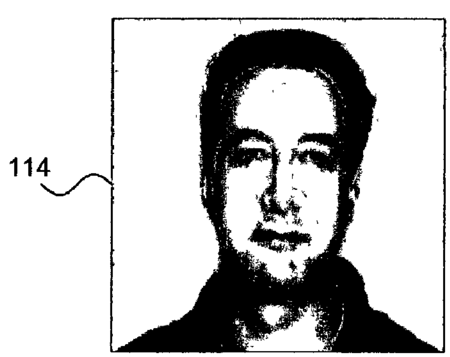
FIG. 1E shows an exemplary restored image, as contemplated by one embodiment of the invention.

In FIG. 1E, a restored image 114 is shown. The restored image 114 is produced by reversing the image compression and warping applied to the smaller warped image 112. Since areas of greater importance are expanded in the warped image 112, they suffer less information loss during the compression stage. Consequently, more image detail is preserved in regions of greater importance when the image 114 is restored. It is noted that the restored image 114 may not necessarily occupy the same canvas size as the original image 102. For example, the restored image may be used for texture painting on a three-dimensional model and may therefore be transformed to appear on a rendered surface.

Figure 2:
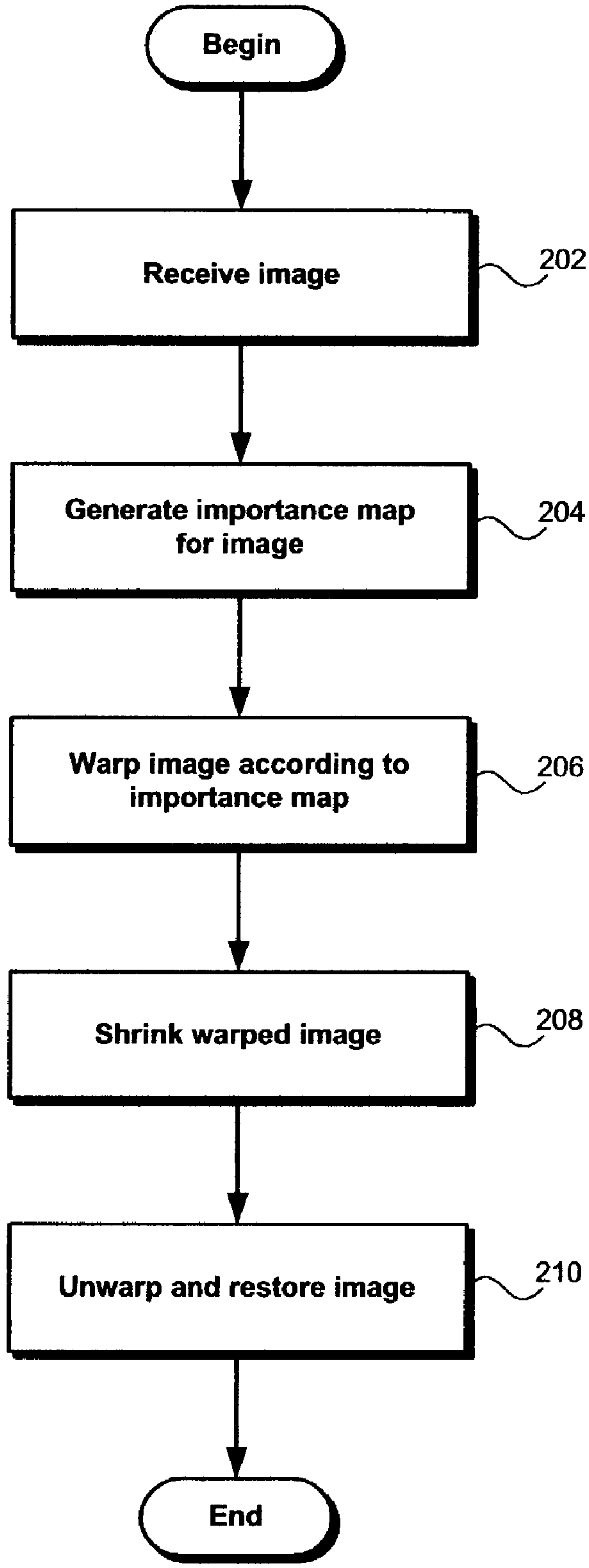
FIG. 2 shows an exemplary flowchart of operations performed by a system contemplated by the present invention.

In FIG. 2, a flowchart of operations performed in a system contemplated by the present invention is shown. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The process begins at receiving operation 202. During this operation, an image is input by the system. As mentioned above, the image may be of any type and may be encoded using various methods known in the art. In one embodiment of the invention, the image is a texture image used to paint polygons forming a three-dimensional model in computer graphics applications. Typically, a texture image includes a set of texture coordinates in the image space that permit image transformation onto the model surface. After the receiving operation 202 is completed, control passes to generating operation 204.

At generating operation 204, an importance map is generated for the image. This operation may include receiving the importance map from a user or a graphics development package. Alternatively, the system may process the image and generate an importance map automatically, as described in detail below. After the generating operation 204 is completed, control passes to warping operation 206.

At warping operation 206, the image is warped according to the importance map such that regions of greater importance in the image are magnified, while regions of lesser importance are reduced. In one embodiment of the invention, a grid relaxation algorithm is utilized to resample the image, as discussed in detail below. After the warping operation 206 is completed, control passes to shrinking operation 208.

At shrinking operation 208, the amount of system resources required by the warped image is reduced. This operation may entail shrinking the image size, applying compression algorithms to image, or performing other such procedures known by those skilled in the art. Once the shrinking operation 208 is completed, the warped image may be stored in computer graphics memory or transmitted across communication links, such as an accelerated graphics port (AGP). When the warped image is to be redisplayed, control then passes to unwarping operation 210.

At unwarping operation 210, the warped image is transformed back to an undistorted image. This operation typically involves undoing the shrinking and warping operations 208, 206 previously executed. In one embodiment of the invention, the unwarping operation 210 includes an image transformation onto a polygonal mesh to form a three-dimensional rendering of an image, as discussed in detail below. Once the unwarping operation 210 is completed, the process is ended.

Figure 3:
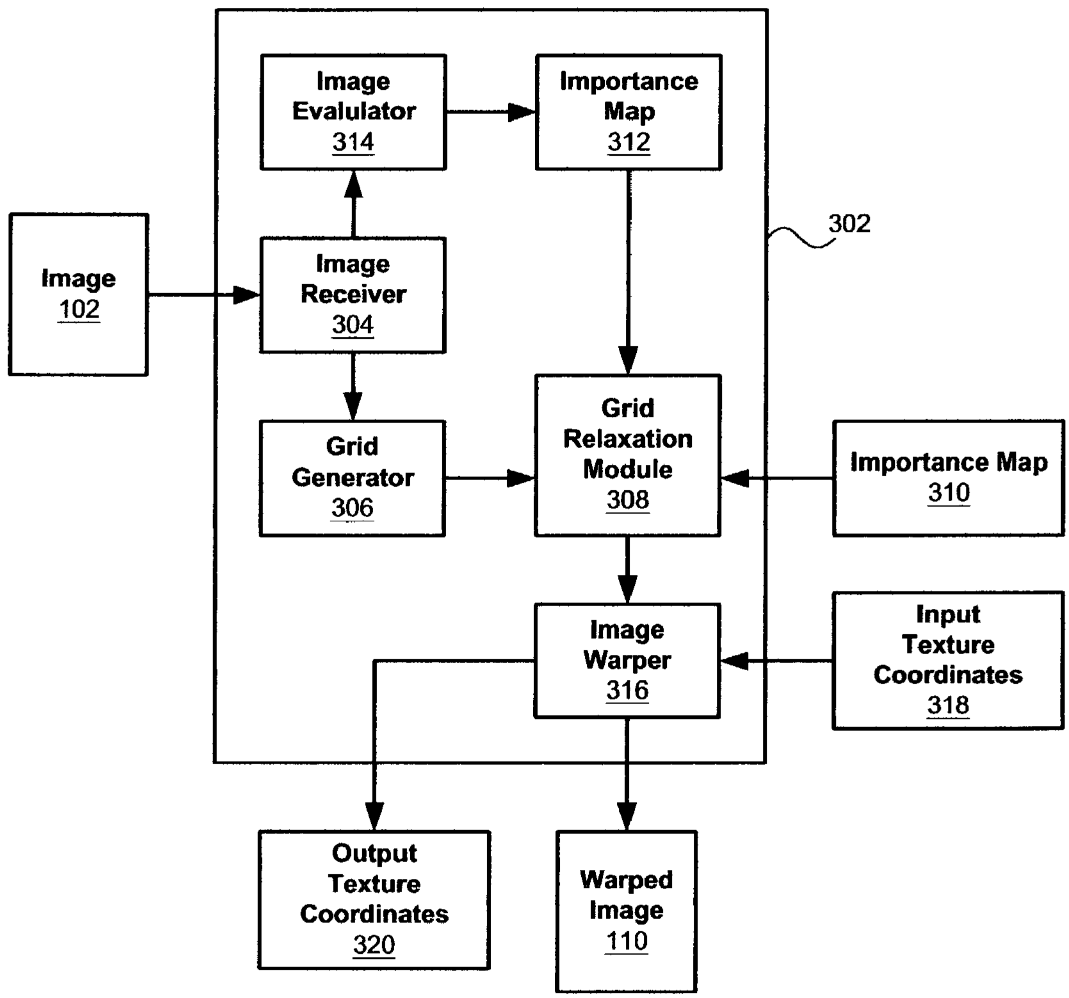
FIG. 3 shows an exemplary system contemplated by one embodiment of the present invention.

In FIG. 3, an exemplary system 302 contemplated by the present invention is shown. In accordance with the present invention, modules forming the system 302 can be computer readable program codes embodied in computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the management agents. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 4A:
FIG. 4A shows an exemplary input image utilized by the present invention.
Figure 4B:
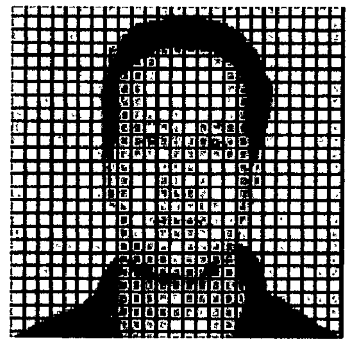
FIG. 4B shows an exemplary input image with a uniform grid.

The system 302 includes an image receiver 304 configured to receive an input image 102. For reference, an exemplary input image 102 is depicted in FIG. 4A. Returning to FIG. 3, the image receiver 304 is coupled to a grid generator 306. The grid generator is configured to define a uniform grid in the input image 102. FIG. 4B shows the input image 102 with an exemplary uniform grid. It is contemplated that the number of rows and columns in the grid may be adapted to the input image 102. In one embodiment of the invention, the grid resolution may be iteratively refined according to the state of convergence of a Laplacian smoothing procedure (described in detail below). In this approach, the grid resolution is initially made low, but is gradually increased across grid relaxation iterations. Thus, the number of vertices in the grid may depend on the image size, color, and/or other image attributes. In a particular embodiment of the invention, the system user may interactively specify the accuracy of the grid and thus directly influence the accuracy of the warping procedure described below.

Returning again to FIG. 3, the grid generator 306 is coupled to a grid relaxation module 308. The grid relaxation module 308 relaxes the uniform image grid to produce a relaxed grid according to an importance map. As mentioned above, an importance map 310 may be specified by a user, or an importance map 312 may be generated by the system 302. In the case where the user provides the importance map 310, the importance map 310 may be another image where each pixel location specifies an importance for the corresponding image pixel. The possibility for the user to pass an importance map 310 allows specific transformation of the image 102 to be performed.

Alternatively, an image evaluator 314 coupled to the image receiver 304 may be configured to generate the importance map 312. In one embodiment of the invention, the importance map 312 is generated using a wavelet packet expansion transform to analyze the frequency content of the input image 102. This transform decomposes an image into a set of coefficients characterizing frequency subbands.

Figure 5:
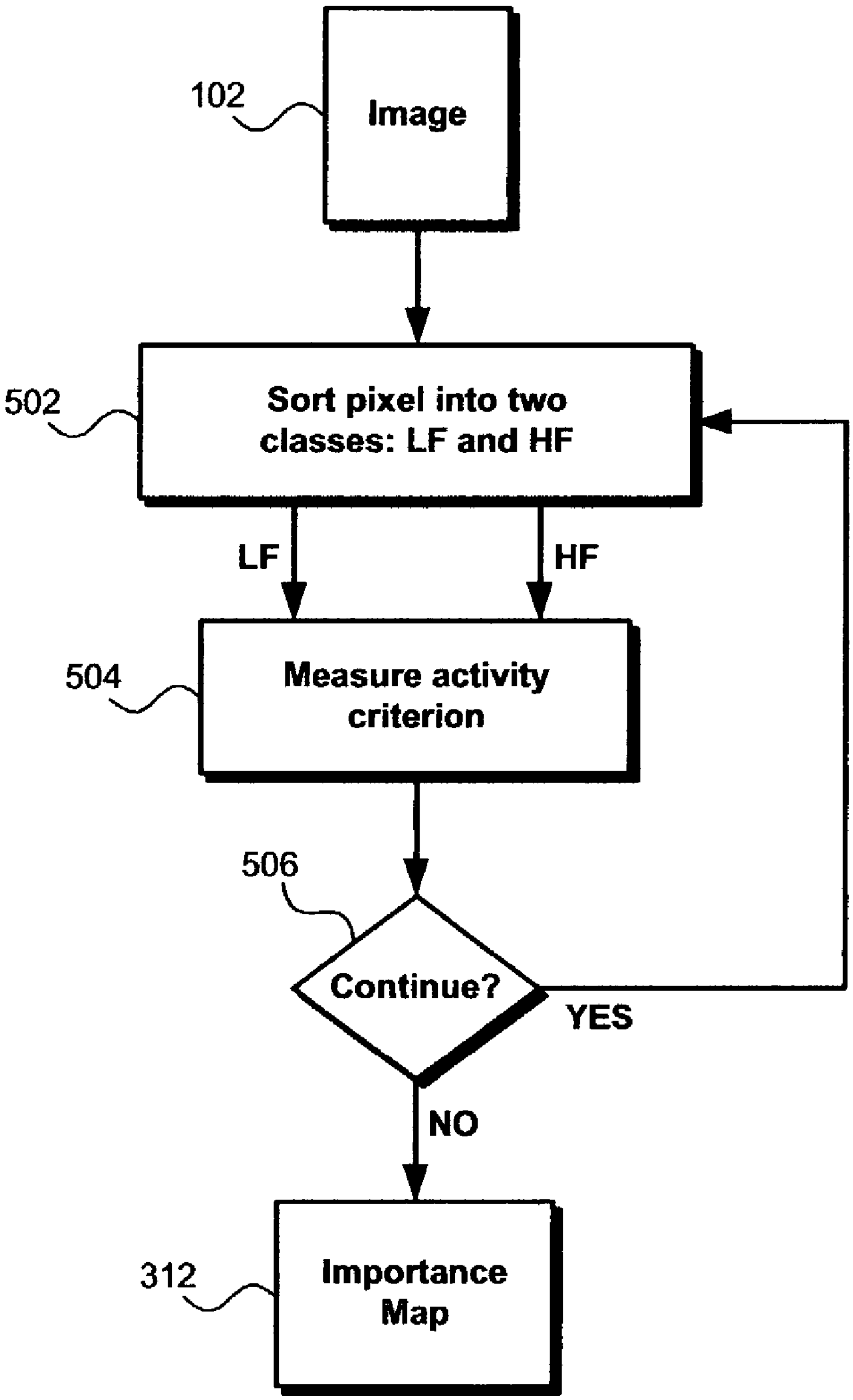
FIG. 5 shows an exemplary a wavelet packet expansion transform process contemplated by the present invention.
Figure 6A:
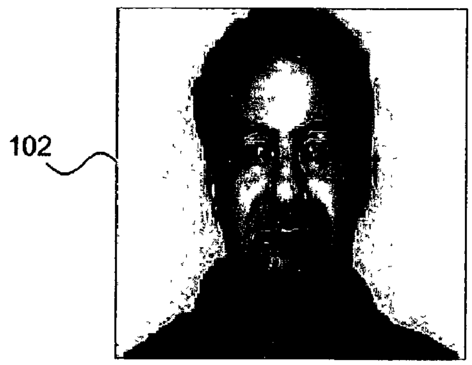
FIG. 6A shows an exemplary input image contemplated by the present invention.
Figure 6B:
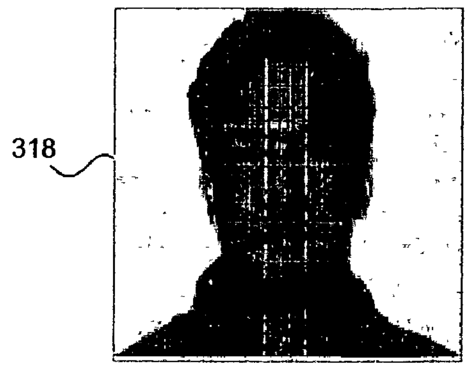
FIG. 6B shows an exemplary input image coordinates contemplated by the present invention.
Figure 6C:
FIG. 6C shows an exemplary warped image contemplated by the present invention.
Figure 6D:
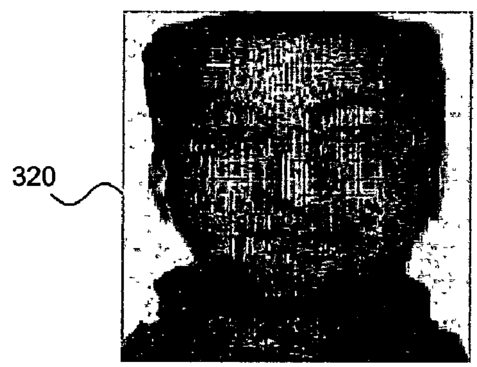
FIG. 6D shows an exemplary warped coordinates contemplated by the present invention.
Figure 6E:
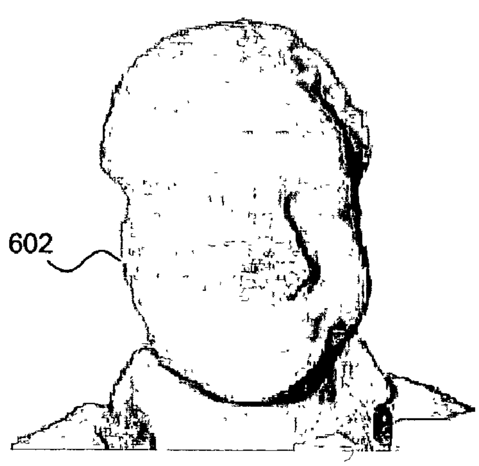
FIG. 6E shows an exemplary image model contemplated by the present invention.
Figure 6F:
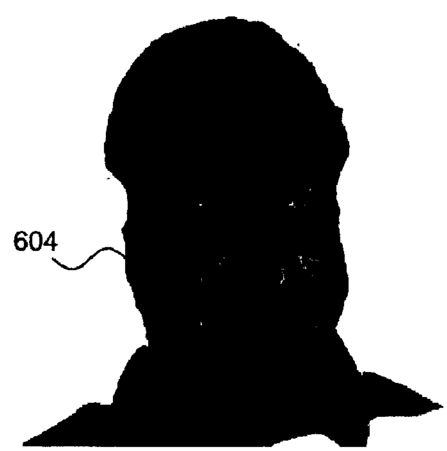
FIG. 6F shows an exemplary painted image model contemplated by the present invention.

Referring now to FIG. 5, a wavelet packet expansion transform process contemplated by the present invention is shown. The process utilizes a multilevel approach to assign an importance value to each pixel in the input image 102. The process includes a classification loop 502, 504, 506 to classify each pixel into two importance classes. Each iteration of the classification loop 502, 504, 506 doubles the number of importance classes for the image. Thus, after the first iteration of the classification loop 502, 504, 506, each pixel in the image 102 is sorted to one of two importance classes. After the second iteration of the classification loop 502, 504, 506, each pixel is sorted into one of four importance classes, and so on. The classification loop is repeated until an activity criterion is satisfied in decision operation 506.

A sorting operation 502 in the process receives the input image 102 and sorts each pixel into a low frequency (LF) class or a high frequency (HF) class. Typically, high frequency regions contain edges and small details, whereas low frequency zones contain low variations in intensity. In order to detect frequency changes accurately, a multiscale analysis of the input image 102 is performed. Hence, edges can be efficiently detected by following local maxima in detail coefficient matrices. These values are referred to as wavelet maxima.

Thus, during the sort operation 502, each pixel I(u,v) is tested for the existence of a wavelet maximum within an area around the corresponding wavelet coefficient. If such a maximum exists, the existence is recorded in the frequency map, denoted by M(u,v). The wavelet packet transform allows maxima to be found at multiple scales (i.e. frequencies), leading to a classification of the image into frequency region.

After the first iteration of the sort operation 502, the image is transformed into a set of low-pass coefficients (describing frequencies between 0 and ǒ/2), and three sets of detail coefficients (representing frequencies between ǒ/2 and ǒ). For each set of detail coefficients, wavelet maxima are measured using a threshold value estimated from the variance in the corresponding subband. Hence, after the first iteration of the classification loop 502, 504, 506, pixels are sorted into two sets and the results are stored in a matrix $M^1(u,v)$ defined as, $$M^1(u,v) = \begin{cases} 1, & \text{if a local maxima was found,} \\ 0.5, & \text{otherwise.} \end{cases}$$

After the second iteration of the sort operation 502, each subband is again split into two half-bands. Hence $M^1(u,v)$ is refined; each previous entry is sorted by looking for wavelets maxima in the corresponding detail matrices. The new matrix $M^2(u,v)$ is therefore defined as, $$M^2(u,v) = \begin{cases} 1, & \text{when } M^1(u,v) = 1, \text{ local maxima,} \\ 0.75, & \text{when } M^1(u,v) = 1, \text{ no local maxima,} \\ 0.5, & \text{when } M^1(u,v) = 0.5, \text{ local maxima,} \\ 0.25, & \text{when } M^1(u,v) = 0.5, \text{ no local maxima} \end{cases}$$

Figure 4C:
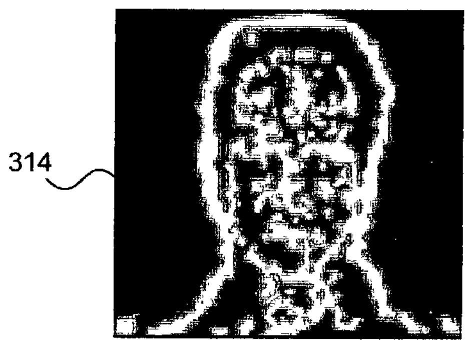
FIG. 4C shows an exemplary importance map contemplated by one embodiment of the present invention.

At measuring operation 504, an activity measurement is performed to determine whether another iteration of the classification loop 502, 504, 506 is necessary. The activity measurement may be based on various metrics, including the number of importance classes, an accuracy of the classification, a computational budget that the user is provided with, a size of the quantity information in the input image 102, or any combination of such activity measurements. If, at decision operation 506, the activity measurement does not reach a threshold level, control returns to sorting operation 502. If the activity measurement reaches the threshold level, the importance map 312 is output and the transform ends. In FIG. 4C, an exemplary importance map 312 generated by the wavelet packet expansion transform is shown.

Figure 4D:
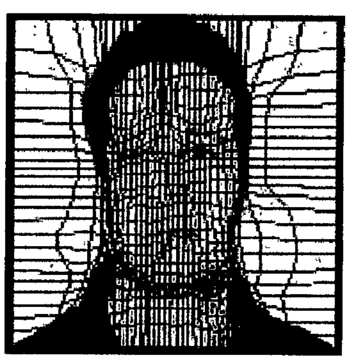
FIG. 4D shows an exemplary relaxed grid contemplated by the present invention.

Returning to FIG. 3, the grid relaxation module 308 uses a relaxation algorithm to concentrate grid vertices in more important regions of the input image 102 and disperse grid vertices in less important regions of the input image 102, as indicated by the importance map 310 or 312. For example, FIG. 4D shows the input image with a relaxed grid in accordance with the importance map of FIG. 4C. As illustrated in FIG. 4D, the vertices of the relaxed grid are aggregated in regions containing more detail and dispersed in regions containing less detail.

In one embodiment of the invention, a Laplacian smoothing procedure is utilized to evenly distribute information across the image, stretching or shrinking regions according to the importance map. In particular, the grid relaxation module 308 relaxes the uniform grid by minimizing the energy function:

$$E_\sigma(v) = \sum_{e=(i,j)} \sigma(v_i)\sigma(v_j)|v_i - v_j|^2.$$

This relaxation procedure moves the vertices to new locations so that the distance $|v_1-v_j|$ between two vertices $v_1$ and $v_j$ connected by a grid edge e=(i,j) is approximately inversely proportional to the frequency map ó at the edge midpoint. The relaxation procedure is a successive approximation where the new position of a vertex $v_1^{n+1}$ is determined by adding a displacement to the corresponding current position $v_1^n$. Displacement vectors are computed using, $$\delta_U(v)_i = \sum_{j\in i^*} u_{ij}(v_j - v_i) - \left\{\sum_{j\in i^*} u_{ij}|v_i - v_j|^2\right\}\frac{\nabla\sigma(v_i)}{2\sigma(v_i)}$$

where i* is the set of grid vertex indices connected to i by a grid edge, and $$\begin{cases} u_i = \sum_{j\in i^*} \sigma(v_j) \\ u_{ij} = \sigma(v_j)/u_i. \end{cases}$$

The four corners of the unit square (which correspond to four vertices of the gird) are constrained not to move, and other boundary vertices are constrained to only move along their supporting straight boundary segments. The results are constrained-displacement vectors $ä(v^n)_1$, which are subsequently applied to the current vertex positions, $$v_i^{n+1} = v_i^n + \delta(v^n)_i \; i=1, \ldots, N.$$

Figure 4E:
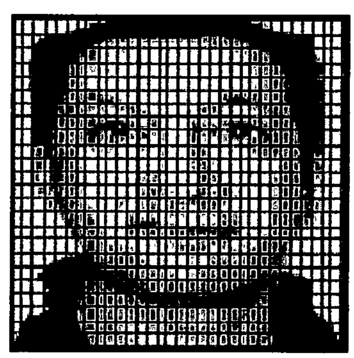
FIG. 4E shows a warped image contemplated by one embodiment of the present invention.

Returning to FIG. 3, the relaxed grid obtained at the grid relaxation module 308 is used to resample the input image 102 by an image warper 316, thereby producing the warped image 110. The resampling process performed by the image warper 316 includes querying each pixel in the warped image 110 for a location in the input image 102 using the relaxed grid (which lies in the domain of the input image). The returned location is used to retrieve a color intensity that is then copied at the starting location in the warped image 110. These steps are repeated for each pixel in the warped image 110, as shown in FIG. 4E.

The present invention is particularly beneficial in graphics systems employing texture mapping. In such systems, a two-dimensional texture image is associated with texture coordinates that are used to paint a three-dimensional model. Modern graphics accelerators are typically capable of automatically translating (or texture mapping) the texture image onto the model using supplied texture coordinates.

Thus, returning to FIG. 3, a set of input texture coordinates 318 associated with the input image 102 are also warped by the image warper 316 in the same fashion as the input image 102. Specifically, each coordinate in the input texture coordinates 318 is warped to a new warped coordinate dictated by the relaxed grid. The result is a set of output texture coordinates 320 corresponding to the warped image 110.

For example, in FIGS. 6A–6F, images illustrating the texture mapping system contemplated by the present invention are shown. The texture mapping system includes the input image 102 and a set of input image coordinates 318 within the input image domain. The input image coordinates 318 correspond to coordinates of a three-dimensional model, 602 onto which the input image 102 is to be painted. Thus, the input image 102 is mapped onto the model 602, producing a painted three-dimensional image 604. As mentioned, most modern graphics accelerators are configured to automatically texture map the three-dimensional model 602 when supplied the input image 102 and the input texture coordinates 318.

In one embodiment of the present invention, both the input image 102 and the input coordinates 318 are warped according to the relaxed grid, thereby producing the warped image 110 and the warped coordinates 320. Since the coordinates are warped along with the image, little or no distortion appears at the three-dimensional image 604 when the model 602 is painted using the warped image 110 and the warped coordinates 320. Thus, the warped image 110 is "unwarped" automatically by modern graphics accelerators having texture mapping capabilities. The present invention may therefore be employed to compress images while preserving their details using existing graphics accelerator technology to unwrap the processed images.

Figure 7A:
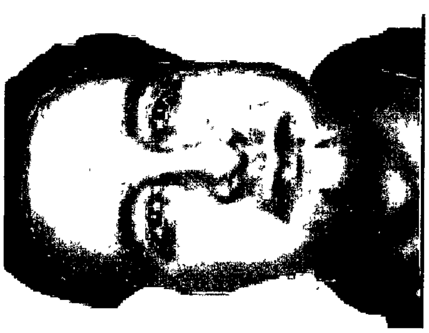
FIGS. 7A–7D show an image texture mapped onto a three-dimensional model without employing the optimization process contemplated by the present invention.
Figure 7B:
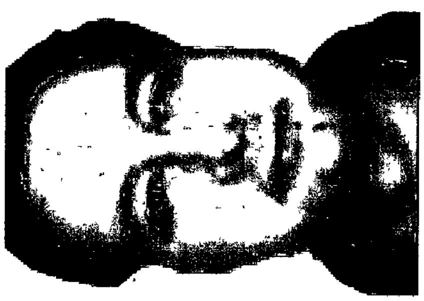
Figure 7C:
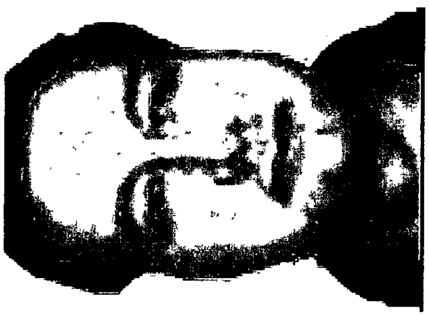
Figure 7D:
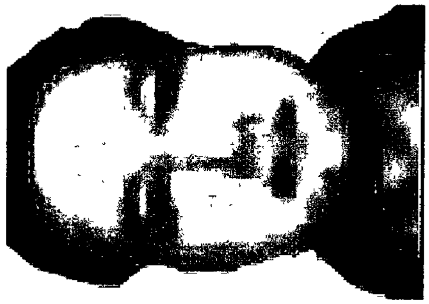
Figure 8A:
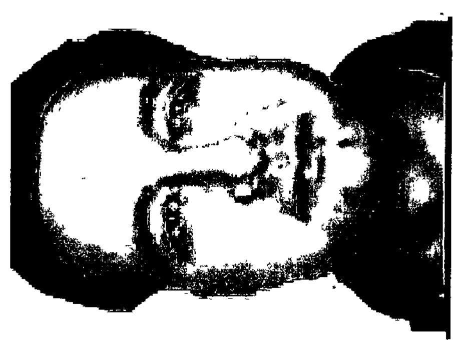
FIGS. 8A–8D show an image texture mapped onto a three-dimensional model employing the optimization process contemplated by the present invention.
Figure 8B:
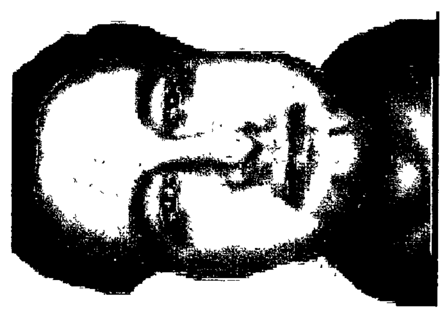
Figure 8C:
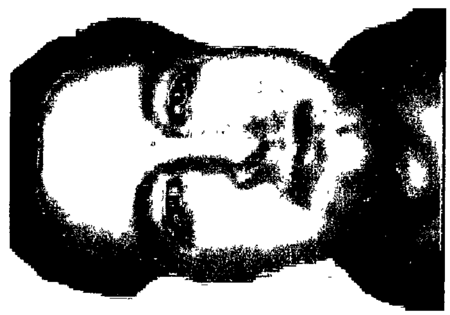
Figure 8D:
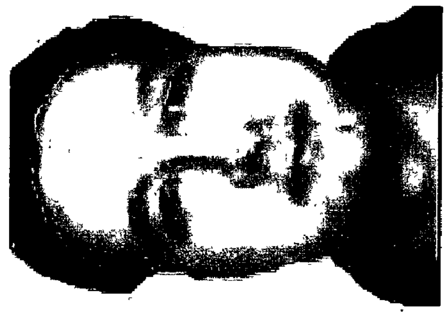

To better illustrate the advantages of the present invention, reference is now made to FIGS. 7A–7D and FIGS. 8A–8D. In FIGS. 7A–7D, an image is texture mapped onto a three-dimensional model without employing the optimization process contemplated by the present invention. In FIGS. 8A–8D, the image is texture mapped onto the three-dimensional model with the optimization process contemplated by the present invention. FIGS. 7A and 8A show texture mappings using the original (unreduced) image. FIGS. 7B and 8B show texture mappings after the image is reduced to 30% of the original image. FIGS. 7C and 8C show texture mappings after the image is reduced to 20% of the original image. FIGS. 7D and 8D show texture mappings after the image is reduced to 10% of the original image. Comparing the two sets of figures, it is evident that pixelization artifacts are more visible with the unoptimized textures, especially at 30% and 20% of the original size. Even at 10% of the original size, the optimized image preserves some high-frequency details that are absent in the unomptimized version.

Figure 9A:
FIG. 9A shows an exemplary atlas image contemplated by the present invention.
Figure 9B:
FIG. 9B shows an exemplary warped atlas image contemplated by the present invention.
Figure 9C:
FIG. 9C shows a rendered three-dimensional model.
Figure 9D:
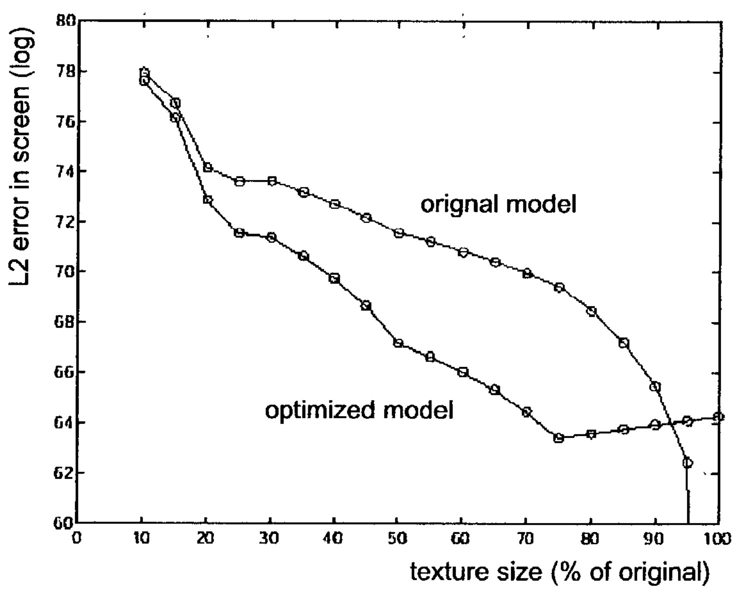
FIG. 9D shows a graph of subsampling errors using both an original atlas image and a warped atlas image.

In FIG. 9A, a texture atlas image of a garden gnome is shown. The atlas image is used to texture map a three-dimensional model viewed from various perspectives. In FIG. 9B, the original atlas image is shown warped according to the present invention. Both the original atlas image and the warped atlas image are used to render the three-dimensional image shown in FIG. 9C. Image distortion analysis is then performed on both rendered images at various image compression factors, and is graphed in FIG. 9D. The horizontal axis measures the size of the subsampled image as a percent of the original image. Going from right to left, the texture is progressively shrunk. The vertical axis measures error on a logarithmic scale. Thus, the error introduced by subsampling the images with and without the optimization of the present invention is shown in the FIG. 9D. As shown, the optimized image produces smaller errors for basically all image sizes, except for very small (less than 10%) shrinkage factors.

The foregoing description of the invention has been presented for purposes of illustration and description. It is not intended to be exhaustive or to limit the invention to the precise form disclosed, and other modifications and variations may be possible in light of the above teachings. For example, alternative message sequences may be used by the present invention to select optimal sending and receiving nodes. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for adjusting a unit image area within an input image according to information importance within the unit area, the method comprising:

obtaining an importance map, the importance map delineating regions of higher importance and regions of lower importance in the input image;

warping the input image to produce a warped image according to the importance map such that the regions of higher importance are expanded and the regions of lower importance are contracted; and generating the importance map, wherein generating the importance map includes measuring local frequency components in the input image, wherein measuring the local frequency components includes:

sorting each unit area of the input image into a pair of activity classes; and repeating the sorting operation until an activity measurement criterion is achieved.

2. The method of claim 1, wherein warping the input image includes warping the input image such that a ratio of information importance per unit area is substantially constant throughout the image.

3. The method of claim 1, further comprising warping the position of texture coordinates associated with the input image in order to obtain an inverse warping function.

4. The method of claim 1, further comprising relaxing a uniform grid to form a relaxed grid according to the importance map such that grid vertices within regions of higher importance are contracted and grid vertices within regions of lesser importance are expanded.

5. The method of claim 4, wherein warping the input image comprises applying a transformation using the relaxed grid to each unit area to compute a new location in the input image for each location of unit area within the input image.

6. The method of claim 1, further comprising shrinking the warped image.

7. The method of claim 1, further comprising unwarping the warped image.

8. A computer program product embodied in a tangible media comprising:

computer readable program codes coupled to the tangible media for adjusting a unit image area within an input image according to information importance within the unit area, the computer readable program codes configured to cause the program to:

obtain an importance map, the importance map delineating regions of higher importance and regions of lower importance in the input image;

warp the input image to produce a warped image according to the importance map such that the regions of higher importance are expanded and the regions of lower importance are contracted; and relax a uniform grid to form a relaxed grid according to the importance map such that grid vertices within regions of higher importance are contracted and grid vertices within regions of lesser importance are expanded.

9. The method of claim 8, wherein the computer readable program code to warp the input image includes warping the input image such that a ratio of information importance per unit area is substantially constant throughout the image.

10. The computer program product of claim 8, further comprising computer readable program code to warp the position of texture coordinates associated with the input image in order to obtain an inverse warping function.

11. The computer program product of claim 8, further comprising computer readable program code to generate the importance map.

12. The computer program product of claim 11, wherein the computer readable program code to generate the importance map includes computer readable program code to measure local frequency components in the input image.

13. The computer program product of claim 12, wherein the computer readable program code to measure the local frequency components includes:

computer readable program code to sort each unit area of the input image into a pair of activity classes; and computer readable program code to repeat the sorting operation until an activity measurement criterion is achieved.

14. The computer program product of claim 8, wherein the computer readable program code to warp the input image comprises applying a transformation using the relaxed grid to each unit area to compute a new location in the input image for each location of unit area within the input image.

15. The computer program product of claim 8, further comprising computer readable program code to compress the warped image.

16. The computer program product of claim 8, further comprising computer readable program code to unwarp the warped image.

* * * * *